UNITED STATES PATENT OFFICE.

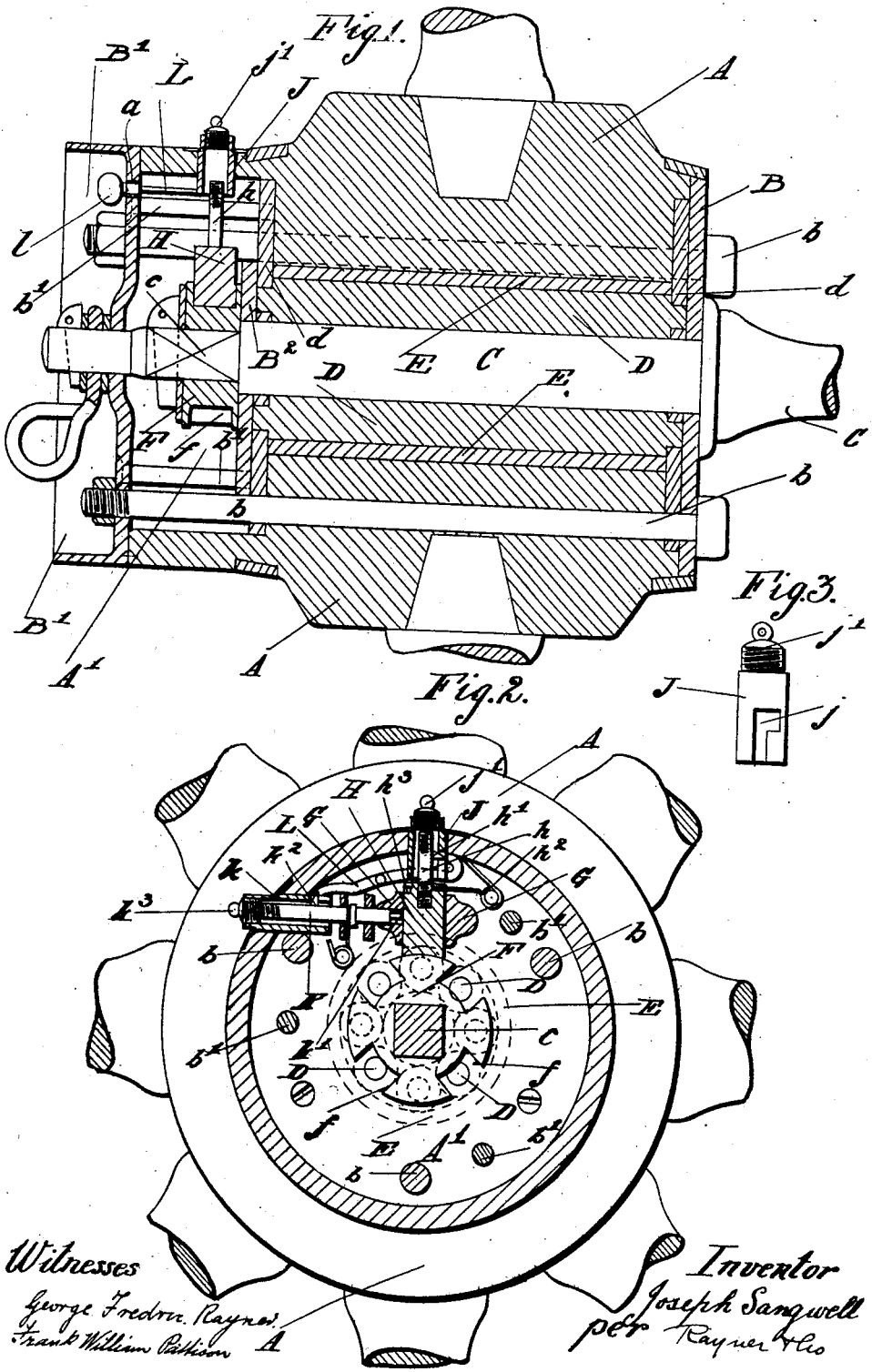

JOSEPH SANGWELL, OF DEVONPORT, ENGLAND.

VEHICLE-WHEEL.

No. 826,065.   Specification of Letters Patent.   Patented July 17, 1906.

Application filed August 24, 1905. Serial No. 275,579.

*To all whom it may concern:*

Be it known that I, JOSEPH SANGWELL, a subject of the King of Great Britain and Ireland, residing at 5 York Place, Stoke, Devonport, in the county of Devon, England, have invented certain new and useful Improvements in Vehicle-Wheels, of which the following is a specification.

This invention relates to wheels for vehicles, and more especially to wheels for heavy work — such as gun - carriages, transport-wagons, brewers' drays, and the like—and enables the wheels to be locked instantly upon their axles.

The wheel is provided for preference with roller-bearings carried by end plates and rolling within a tubular metal sheath. Upon the stationary axle is fixed a stop consisting of a ring having a number of large teeth or projections between which for locking purposes the end of a sliding bolt carried by the hub of the wheel can project. This bolt slides within a metal sheath or tube, and a spring causes it to engage when free with the stop. The bolt is notched to receive the end of a catch-bolt also provided with a spring and concealed in a tube fixed in the hub. The locking-bolt and catch have each a withdrawing-pin inclosed in the tube and reached only by a specially-constructed key after a cap has been removed. Both catch and locking-bolt are released simultaneously by a slide operated from the outside of the hub by means of a pin, the slide engaging projections on the withdrawing-pins which pass through slots in the inclosing tubes.

To lock the wheel on the axle either for descending a steep hill or to render the wagon or carriage useless, the slide is withdrawn, when the locking-bolt springs forward, engaging immediately or after a slight movement of the wheel in the stop-piece, whereupon the catch engages in the notch of the bolt and prevents its withdrawal. To release the wheel, the slide is moved back, the cap of the catch-tube removed and the key inserted, engaged with the catch-pin, drawn back and turned until the catch is replaced in slot in tube. A similar action serves to withdraw the locking-bolt, which can of course be pulled back only after the catch has been withdrawn.

The arrangement of locking and releasing is more especially intended for gun-carriages, enabling the gun to be rendered ineffective by simply releasing the lock and removing the key. The apparatus is inclosed by end plates on the hub connected by large bolts passing through the hub, and the plate covering the locking device is also secured by screws with concealed heads, so that the apparatus would have to be broken open and destroyed in order to release the wheel without using the key.

For ordinary heavy vehicles simple means of release would be provided not necessitating the use of a key. The arrangement of the slide enables a wheel to be locked even when moving, so that on a horse bolting it could quickly be brought to a standstill without danger.

In order that this invention may be more readily understood, reference is had to the accompanying sheet of drawings, in which—

Figure 1 is a section of a hub constructed according to my invention. Fig. 2 is a sectional view at right angles, taken through one end of the hub; and Fig. 3 is a detail.

The hub A has the two metal plates B and B' at its ends, these plates inclosing and supporting the inner parts. The axle C is mounted in a roller-bearing consisting of the rollers D, turning in bearings in the fixed plates $d$ and inclosed within the tube E, into which lubricating material can be introduced. The outer plates B and B' are bolted together by the large bolts $b$, extending completely through the hub.

At the outer end of the hub is a cavity A', formed by the outer plate B', which covers a recess in the hub A, and in this cavity is the special locking device which forms the main part of this invention. To prevent access to this cavity, the plate B' is not merely secured by the large bolts $b$, but also by the small concealed screw-bolts $b'$, the heads of which are covered. The bolts $b'$ are screwed into the plate $B^2$ on the end of the axle. This prevents in the case of gun-carriages which have been disabled in the manner hereinafter described the internal mechanism being reached and readjusted.

On the square end $c$ of the axle is a fixed collar F, having deep notches or depressions $f$. Sliding in the fixed guides G is a bolt H, having a screw-threaded spindle $h$, projecting into a tube J in the hub. The tube has a bayonet-slot $j$, through which projects the stud $h'$ of the spindle $h$, and when this stud is in the upper part of the slot the bolt H is held clear of the collar F. When the stud is moved on one side, however, the spring $h^2$, bearing on the bolt H, causes it to enter into one of the notches $f$, and the hub is then locked upon the axle and cannot move until the bolt is withdrawn. An additional catch-bolt K is employed, carried in a slotted tube $k$, similar to J, and the end $k'$ of this bolt projects into the recess $h^3$ of H when the latter drops into one of the recesses $f$. The bolt H is thus locked in place, and to withdraw it K has to be first withdrawn by a key inserted through its tube, after which a second key serves to draw back H, releasing the hub from the axle and allowing the wheel to turn. The stud $k^2$ on the bolt K moves in a bayonet-slot in the same manner as $h'$.

To operate the locking mechanism, the trigger L is employed, having a finger-piece $l$ projecting through a slot $a$ in the hub, and on pushing this to one side the two studs $h'$ and $k^2$ are released from the end of the bayonet-slot and the bolts H and K are freed. The tubes J and $k$ are provided with screwed caps or stoppers $j'$ and $k^3$, which have to be removed in order to withdraw the bolts, and then keys must be inserted. If the hub is one belonging to a gun-carriage, the latter can be disabled by locking it as described and removing the keys, in which case the hub would have to be broken open or destroyed in order to unlock the wheel.

What I claim as my invention, and desire to secure by Letters Patent, is—

1. In vehicle-wheels, a fixed recessed collar on the axle, a spring sliding bolt withdrawable by a key, adapted to engage the collar and a second spring-bolt at right angles securing the first in locking position.

2. In vehicle-wheels, a fixed recessed collar on the axle, a spring sliding bolt in the hub withdrawable by a key, a spring catch-bolt at right angles engaging the first bolt, and a trigger or slide operated from outside the hub releasing both bolts simultaneously, substantially as herein described.

3. In vehicle-wheels, a hub containing rollers bearing on the axle, plates on the hub forming bearings for the rollers, a fixed recessed collar on the axle, a spring sliding bolt engaging the recessed collar, means for releasing and withdrawing the sliding bolt and end plates on the hub bolted together and inclosing the entire mechanism.

In witness whereof I have hereunto set my hand in the presence of two witnesses.

JOSEPH SANGWELL.

Witnesses:
J. MOORE,
R. FARRANT.